US008761138B2

(12) United States Patent
Moisanen et al.

(10) Patent No.: US 8,761,138 B2
(45) Date of Patent: Jun. 24, 2014

(54) RADIO ACCESS TECHNOLOGY SELECTION (75) Inventors: Matti Moisanen, Oulu (FI); Petri Pelkonen, Oulu (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/309,952

(22) Filed: Dec. 2, 2011

(65) Prior Publication Data

US 2013/0136115 A1    May 30, 2013

(30) Foreign Application Priority Data

Nov. 29, 2011 (GB) .................................. 1120544.0

(51) Int. Cl.
H04W 4/00 (2009.01)
(52) U.S. Cl.
USPC ........ 370/338; 370/328; 370/331; 455/422.1; 455/436; 455/446
(58) Field of Classification Search
USPC ............... 370/328, 331, 338; 455/422.1, 436, 455/450, 456
See application file for complete search history.

(56) References Cited

U.S. PATENT DOCUMENTS

| | | | | |
|---|---|---|---|---|
| 7,206,604 B2* | 4/2007 | Berra et al. | ................... | 455/560 |
| 7,643,786 B2* | 1/2010 | Soderbacka et al. | ......... | 455/3.01 |
| 7,848,756 B2* | 12/2010 | Nader et al. | ................... | 455/436 |
| 7,957,739 B2* | 6/2011 | Jeong et al. | ................... | 455/436 |
| 8,045,981 B2* | 10/2011 | Umatt et al. | ................... | 455/434 |
| 8,054,791 B2* | 11/2011 | Vujcic | ............................. | 370/329 |
| 8,107,955 B2* | 1/2012 | Islam et al. | .................... | 455/434 |
| 8,280,377 B2* | 10/2012 | Lee et al. | ....................... | 455/436 |
| 8,310,946 B2* | 11/2012 | Somasundaram et al. | ..... | 370/252 |
| 8,364,156 B2* | 1/2013 | Chun et al. | ..................... | 455/449 |
| 2005/0090278 A1* | 4/2005 | Jeong et al. | .................... | 455/525 |
| 2006/0084443 A1* | 4/2006 | Yeo et al. | ....................... | 455/449 |
| 2007/0265010 A1* | 11/2007 | Fujita et al. | .................... | 455/436 |
| 2008/0102784 A1* | 5/2008 | Mittal et al. | ............... | 455/404.1 |
| 2008/0268843 A1* | 10/2008 | Ore et al. | ................... | 455/435.3 |
| 2009/0088160 A1* | 4/2009 | Pani et al. | ...................... | 455/436 |
| 2009/0239535 A1* | 9/2009 | Chun et al. | ................. | 455/435.2 |
| 2009/0247160 A1* | 10/2009 | Muller | ........................ | 455/435.3 |
| 2010/0113010 A1 | 5/2010 | Tenny et al. | ................... | 455/423 |
| 2010/0278142 A1* | 11/2010 | Dwyer et al. | ................. | 370/331 |
| 2010/0279677 A1* | 11/2010 | Dwyer et al. | ............... | 455/422.1 |
| 2010/0279691 A1* | 11/2010 | Dwyer et al. | ................. | 455/436 |
| 2010/0323714 A1* | 12/2010 | Schmidt et al. | ............ | 455/456.1 |
| 2010/0329244 A1 | 12/2010 | Buckley et al. | ............... | 370/352 |

FOREIGN PATENT DOCUMENTS

WO    WO 2011/053849 A2    5/2011

* cited by examiner

*Primary Examiner* — Andrew Lai
*Assistant Examiner* — Andrew C Lee
(74) *Attorney, Agent, or Firm* — Stanton IP Law (57) ABSTRACT

There is provided a method, including detecting, by a user terminal connected to a public land mobile net-work, PLMN, via a first radio access technology and having requested a circuit switched fallback service procedure, that a network controlled radio access technology change related to the circuit switched fallback service procedure is not performed; and selecting a second radio access technology to be applied on the basis of stored information, wherein the second radio access technology to be applied is capable to provide circuit switched services and the stored information associates at least one PLMN with at least one radio access technology.

16 Claims, 3 Drawing Sheets

RADIO ACCESS TECHNOLOGY SELECTION

FIELD

The invention relates generally to mobile communication networks. More particularly, the invention relates to selecting a radio access technology (RAT) when a circuit switched fallback (CSFB) service request fails.

BACKGROUND

A packet-based radio communication network, such as the Long Term Evolution (LTE) or the LTE-Advanced (LTE-A) of the $3^{rd}$ Generation Partnership Project (3GPP), may offer a large variety of services. However, there may be a need to request a circuit switched fallback (CSFB) service for example when voice data is to be transferred. It may also happen that such CSFB may fail and as a result the user terminal (UT) requesting the CSFB may not be able to perform the circuit switching/switched services directly.

BRIEF DESCRIPTION OF THE INVENTION

Embodiments of the invention seek to improve the efficiency of communication network.

According to an aspect of the invention, there is provided an apparatus comprising means configured to perform any of the embodiments as described in the appended claims.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the $3^{rd}$ Generation Partnership Project (3GPP), are typically composed of at least one base station (also called a base transceiver station, a radio network controller, a Node B, or an evolved Node B, for example), at least one user equipment (UE) (also called a user terminal, terminal device or a mobile station, for example) and optional network elements that provide the interconnection towards the core network. The base station connects the UEs via the so-called radio interface to the network. The base station may provide radio coverage to a cell, control radio resource allocation, perform data and control signaling, etc. The cell may be a macrocell, a microcell, or any other type of cell where radio coverage is present.

In general, a base station may be configured to provide communication services according to at least one of the following radio access technologies (RATs): Worldwide Interoperability for Microwave Access (WiMAX), Global System for Mobile communications (GSM), GSM EDGE radio access Network (GERAN), General Packet Radio Service (GPRS), Universal Mobile Telecommunication System (UMTS) based on basic wideband-code division multiple access (W-CDMA), high-speed packet access (HSPA), LTE, and/or LTE-A. The present embodiments are not, however, limited to these protocols. The base station may be node B (NB) as in the LTE, evolved node B (eNB) as in the LTE-A, a radio network controller (RNC) as in the UMTS, a base station controller (BSC) as in the GSM/GERAN, or any other apparatus capable of controlling radio communication and managing radio resources within the cell.

Figure 1:
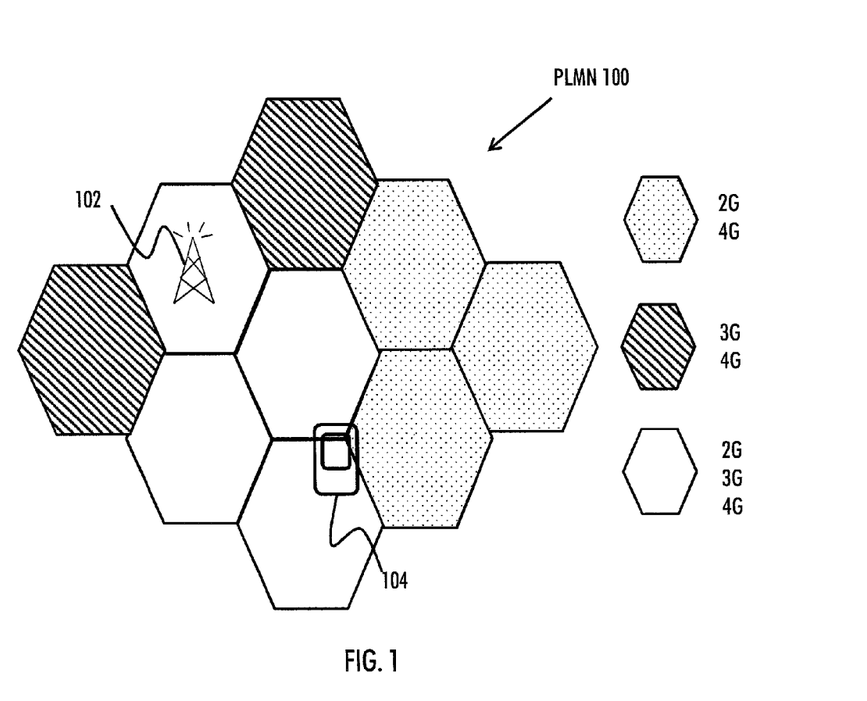
FIG. 1 presents a example public land mobile network.

A public land mobile network (PLMN) 100, as shown in FIG. 1, may denote a network that is established and operated by an administration or by a recognized operator. User terminals 104 may connect to the PLMN in order to enable mobile cellular services to take place. In FIG. 1, the PLMN 100 is shown to be a continuous geographical area comprising a plurality of smaller geographical areas (shown with hexagons) which may be seen as cells, tracking areas, etc. A base station 102 may provide coverage to the cell or to a plurality of cells. However, a PLMN may also comprise several geographically separated areas, depending on the deployment of base station providing coverage to the PLMN. Each PLMN may be identified by the code or an identifier, such as a Mobile Country Code (MCC) or the Mobile Network Code (MNC). In general, each operator providing mobile services may have its own PLMN. The PLMNs may interconnect with other PLMNs and with a public switched telephone networks (PSTN) in order to enable telephone communications or with internet service providers in order to enable data and internet access. The user terminals (UT) 104 in the area may connect the PLMN via an air interface, such as a UMTS terrestrial radio access (UTRA) and an evolved UTRA. The UT 104 may operate in its home PLMN (HPLMN) or equivalent home PLMN (EHPLMN). However, a visited PLMN (VPLMN) may be selected for example if the UT 104 loses coverage to the HPLMN. The PLMN selection may take place automatically without user interaction or manually, in which case the UT 104 indicates to the user which PLMNs are available and the user may select the PLMN to connect to.

A PLMN may cover a geographically large area. However, the accessibility to different radio access technologies may not be the same over the entire PLMN area. A radio access technology, or RAT, may be used to access the services provided by the PLMN. Different RATs may comprise, for example, GSM. GERAN, GPRS, CDM-2000 (i.e. 1×RTT), UMTS, HSPA, LTE, and LTE-A. For simplicity reasons, let us denote at least GSM, GERAN, GPRS, 1×RTT as a 2G, at least UMTS, HSPA as a 3G and at least LTE, and LTE-A as a 4G throughout the application. However, the embodiments are not limited to these RATs, but different RATs are applicable as well. For illustrative purposes FIG. 1 shows hexagons with dotted marks as areas where the PLMN is provided by the 2G and the 4G, hexagons with left leaning diagonal lines as areas where the PLMN is provided by the 3G and the 4G, and unmarked hexagons with as areas where the PLMN is provided by the 2G, the 3G and the 4G. Thus, the user terminal 104 may not be able to access the 3G in every location even though the UT 104 may stay connected to the PLMN 100. Also, it should be noted that the coverage of the 4G may also disappear within the PLMN 100, although not shown here for illustrative purposes. The RATs may vary in technical requirements and specifications, and in the way the radio access is provided, for example. This may affect the services being provided, for example. Therefore, it should be noted that different RATs may provide different services or at least use different means in providing the services.

As an example, the 2G and the 3G RATs may be able to perform circuit switching. A circuit switching, or a circuit switched, (CS) is a technology where two network nodes establish a dedicated communication channel (i.e. a circuit) through the network before the nodes may communicate. This may be advantageous because the circuit may guarantee wide bandwidth of the channel and ensure that the nodes remains connected for the duration of the communication session. Such a circuit switching may be applied for voice data transfers, for example, in order to reach high quality of service (QoS) without interruptions. However, for example the 4G may apply packet switching in contrast to the circuit switching. Packet switching shares available network bandwidth between multiple communication sessions. As such, CS domain services may comprise at least those services that may be offered in the CS capable RATs, such as in the 2G and the 3G networks. Examples of such services may include: voice and its supplementary services (e.g. call waiting, call forwarding) and video streaming, etc. It should be noted that in the application the 2G and the 3G comprise all RATs that may provide CS domain capability whereas the 4G may be used to commonly denote all RATs without such CS domain capability.

Figure 2:
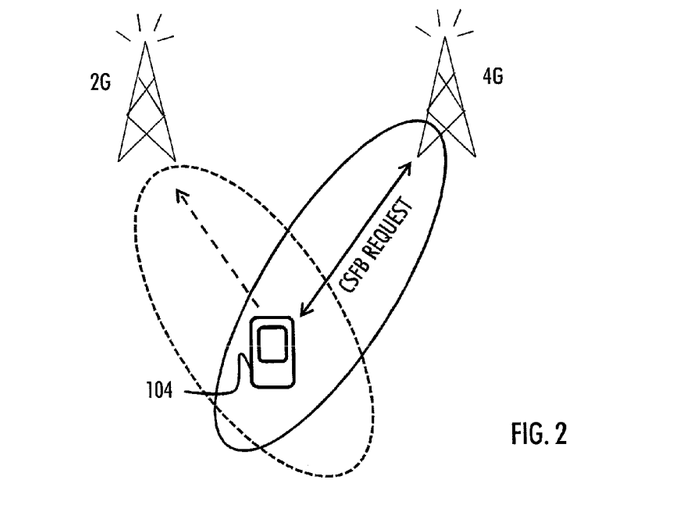
FIG. 2 shows a user terminal being in the coverage area of two radio access technologies.

Although, for example, voice services may be provided by the 4G as a packet service, such as voice over IP (VOIP), there may be a need by at least some PLMN providing the 4G (or any packet network) services to allow a circuit switched fallback (CSFB) in order to provide better QoS, for example. There may be a need for a user applying the 4G, for example, to request the CSFB in order to use services requiring or preferably provided by circuit switching, as shown in FIG. 2. FIG. 2 shows the user terminal 104 being in a location to which coverage is provided by the 4G RAT and the 2G RAT. The UT 104 may decide to request for CSFB from the 4G RAT as shown with the bidirectional solid line. In the CSFB request, or in an extended service request as the CSFB request may also be called, the UTs 104 requesting the CSFB may first register to the CS domain via an evolved packet core (EPS), in case the UT 104 is currently served by the LTE, for example. The UT 104 may then perform a CSFB request procedure to the EPS. This may comprise switching the UT 104 to another RAT capable of providing such circuit switching services. Such RAT may be, for example, the 2G or the 3G. The RAT change may be controlled by the current packet network, such as the LTE. The LTE may control the RAT change by means of a handover, a redirection, or a cell change order, for example. The network may then indicate back to the UT 104 whether the CSFB request is supported and successful or not. When the request is successful, the UT 104 may begin using the CS related service. For example, the UT 104 may request a mobility management entity (MME), in case of GERAN/UTRAN, to perform the CSFB procedures whenever the UT 104 desires to use CS domain services.

In order to support the CSFB procedure, each LTE cell in the PLMN 100 may need to be co-resident with a strong, overlapping GERAN or UTRAN signal (i.e. a RAT capable to provide CS domain services). Without such coverage, the CSFB request procedure may be unsuccessful. As shown in FIG. 2, the 2G (i.e. circuit switching network) coverage is present. However, there may also be some abnormal cases where the CSFB request procedure to a packet switching network, such as the 4G network, fails. In an embodiment the CSFB procedure fails in an abnormal manner because of access being barred because of access class barring. In an embodiment the CSFB procedure fails in an abnormal manner because of non-access stratum (NAS) signalling connection establishment being rejected by the network. In an embodiment the CSFB procedure fails in an abnormal manner because of lower layer causing a failure. In an embodiment the CSFB procedure fails because of the NAS signalling connection being released before the service request procedure is completed or before "service reject" message is received. In an embodiment the CSFB procedure fails in an abnormal manner because of service being rejected. When such abnormal failure of the CSFB procedure takes place, the UT 104 itself may need to select the GERAN or the UTRAN so as to access the CS domain services. This is shown in FIG. 2 with dashed unidirectional arrow towards the CS network, such as the 2G network. By failure it is denoted that the packet switching RAT to which the UT 104 is currently connected to, such as the LTE, may not be able to perform and control the RAT change related to the CSFB procedure. For example, if the service request for CSFB was initiated in the LTE and the access is barred for "mobile originating CSFB" and the lower layer does not indicate "the barring is due to CSFB specific access barring information", the UT 104 itself may need to select the GERAN or the UTRAN radio access technology without assistance from the LTE. In other words, when an extended service request procedure, which has been initiated due to CSFB, fails in certain abnormal ways as indicated above, the UT 104 may select another radio access technology, such as the GERAN or the UTRAN, and try to find a suitable cell there. However, the selection of the new RAT (such as the GERAN or the UMTS) by the UT 104 may be inefficient and may last too long leading to the service failure.

Figures 3, 4, 5, 6:
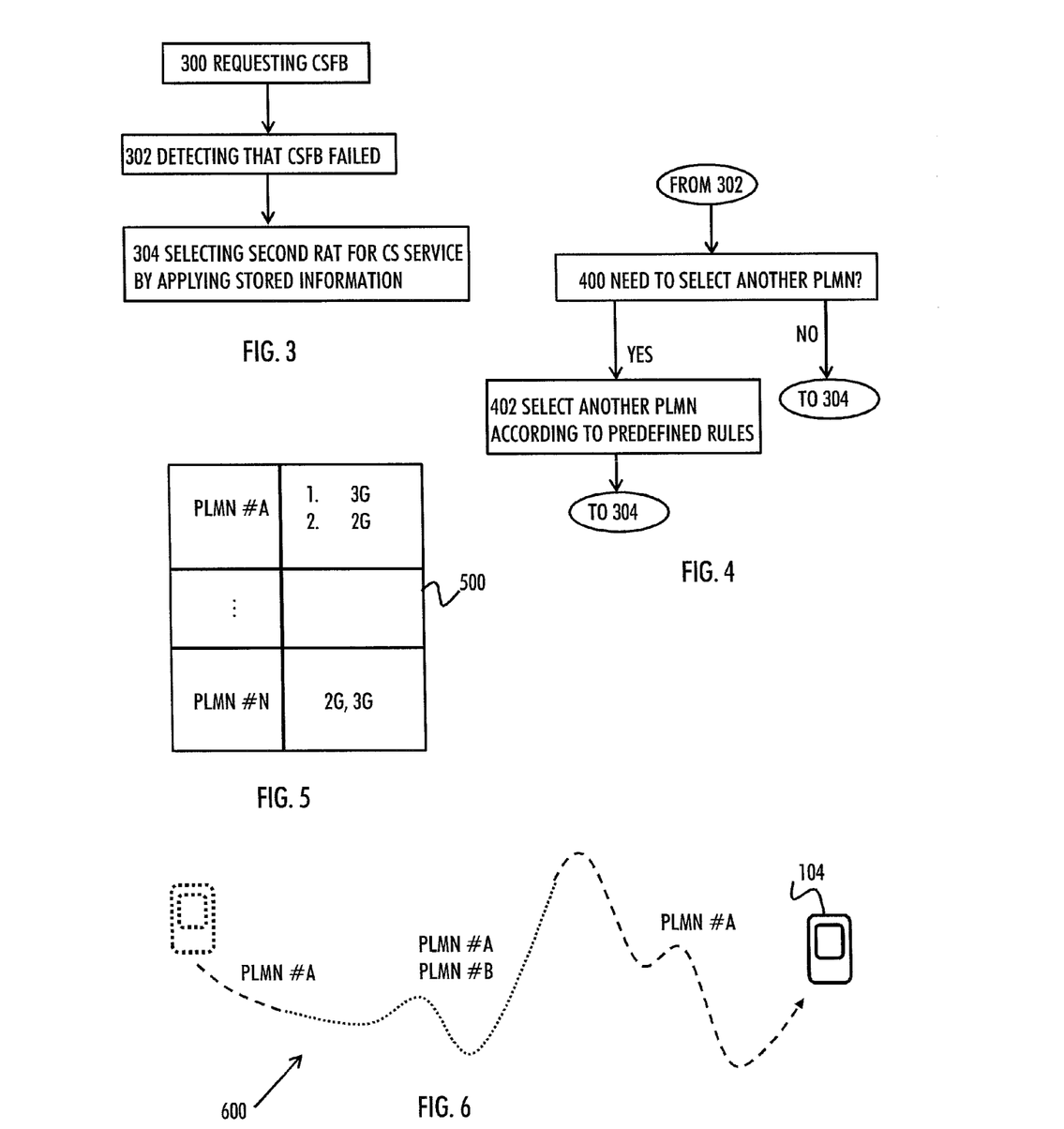
FIGS. 3 and 4 show methods according to embodiments.
FIG. 5 illustrates an example PLMN selector list.
FIG. 6 presents an example trajectory of the user terminal.

At least partly for these reasons it is proposed, as shown in FIG. 3, that it is detected in step 302, by the user terminal 104 connected to a PLMN 100 via a first RAT and having requested a CSFB service procedure in step 300, that a network controlled radio access technology change related to the circuit switched fallback service procedure is not performed. As previously said, the network, such as the first RAT, should control and perform the RAT change for the UT 104 when the UT 104 has requested the CSFB service procedure. However, there may be various reasons why the network is not capable to perform and/or control the RAT change, i.e. the CSFB failure, as indicated above. The UT 104 may wait a certain amount of time, during which the network controlled RAT change should take place. If the time expires, the UT 104 may detect that the network controlled RAT change has failed. Alternatively or in addition to, the UT 104 may apply other means than the timer in detecting that the network controlled RAT change is not going to take place. In an embodiment, the UT 104 may detect when the CSFB fails in the abnormal manner as indicated above. In other words, a normal failure, such as no CS network coverage, may be ignored. The UT 104 may detect that the network controlled RAT change has failed when it receives one of the indications of abnormal failures as explained above. After having detected such failure of CSFB where the first RAT is not able to perform the RAT change, the UT 104 may in step 304 select a second RAT to be applied on the basis of stored information, wherein the second RAT to be applied is capable to provide circuit switching services and the stored information associates at least one PLMN with at least one RAT. The second RAT may be for example the GERAN, the GSM, the 1xRTT network, or any network which is capable to provide CS services. As the selection of another RAT is made by applying the stored information, the selection may advantageously be fast and time-efficient. This may ensure that the required CS service may be performed. The stored information may comprise several pieces of information and the information may be stored anywhere as will become clear from the embodiments. The stored information may associate at least one RAT to at least one PLMN. For example, one PLMN may be coupled to one RAT or to several RATs. The associated RAT(s) may be capable of providing CS services or not. It may be that the information may facilitate the selection between available RATs so that the UT 104 may not need to spend time in determining which of the available RATs to connect to.

In an embodiment the UT 104, after having detected the CSFB failure, may automatically decide to maintain the connection to the current PLMN where the UT 104 was connected to when performing the CSFB request. This may be advantageous so that the UT 104 may not need to spend time in selecting another PLMN. The current PLMN may denote the home PLMN, for example, or the visited PLMN where the UT 104 is visiting at the time of the CSFB request. However, in another embodiment, as shown in FIG. 4, the UT 104 may also determine in step 400 whether another PLMN needs to be selected. If the answer is negative, in which case the current PLMN may be available and/or the connection to the current PLMN may have been sustained, the method may proceed to step 304 of FIG. 3. However, if the answer is positive, in which case the current PLMN may not be available and/or the connection to the current PLMN may have fallen, the method may proceed to step 402. In step 402, the UT 104 may select another PLMN according to predetermined rules. Thereafter, the process may continue to step 304 of FIG. 3. However, in this case the second RAT to be selected provides coverage for the other PLMN selected in step 402 of FIG. 4. In an embodiment, the predetermined rules are defined by at least one of the following: a PLMN selection procedure, a cell re-selection procedure and roaming agreements between at least two PLMNs. Thus, the new PLMN may be selected for example by following the routine PLMN selection/cell reselection algorithms. The roaming agreements may affect the new PLMN selection. For example, if the current PLMN (the one to which the UT 104 was connected to when the UT 104 started the CSFB service request procedure) has a roaming agreement with another PLMN, then the other PLMN may be selected as the new PLMN. Roaming may be seen as a general term referring to extension of connectivity in a location that is different from the home location where a service was registered. Roaming may ensure that the wireless device maintains connected to the network, without losing the connection even if the home network is no longer available. The new PLMN may thus be a visited PLMN, for example. The roaming agreements may, for example, specify which other PLMN(s) the UT 104 is allowed and/or capable to connect to.

In a universal subscriber identity module (USIM), or in a SIM, coupled to the user terminal there may be so-called PLMN selector lists. These list may comprise, for example, an elementary file HPLMN selector with Access Technology (EFHPLMNwAcT), an EF user controlled PLMNwAcT (EFPLMNwACT), and an EF operator controlled PLMNwAcT (EFOPLMNwACT). These PLMN selector lists may each contain PLMN/RAT preferences. Each PLMN may specify which RATs are preferred for the PLMN. Thus, in an embodiment, as shown in FIG. 5, the stored information comprises at least one PLMN selector list 500, wherein the at least one PLMN selector list is predefined by at least one PLMN and comprises at least one RAT candidate for the at least one PLMN. Then the UT 104 may use the list(s) when the UT 104 chooses which RAT should be selected. In other words, as the UT 104 knows which PLMN the UT 104 is connected to, the UT 104 may resolve the RAT from the PLMN selector list(s) on the basis of the current PLMN. The EFHPLMNwAcT may be used when the UT 104 is in its home PLMN, whereas the EFPLMNwACT and the EFOPLMNwACT may be applied when the UT 104 is in a VPLMN, for example.

As said, in an embodiment, the at least one PLMN selector list may be stored in the subscriber identity module (SIM) or to the USIM coupled to the user terminal. The selector list(s) may have been predefined by the operator, for example, and stored in the SIM/USIM before handing the SIM/USIM to the customer. By receiving the SIM and attaching the SIM to the UT 104, the UT 104 may obtain knowledge of the data stored in the SIM, such as the at least one selector list, and may use the data in the SIM card. However, the at least one selector list may be stored in any other memory storage such that the UT 104 may access the data. Examples of possible storage areas may include volatile or non-volatile memories, such as random access memory (RAM) or read-only memory (ROM). The information may be stored in physical memory units, such as chips, or in virtual memory units, for example. The data may also be stored in a module attached to and accessible by the UT 104. The current network may update the at least one selector list stored in the UT 104 by broadcasting/multicasting/unicasting update data to the UT 104. The network may also transmit the data in the beginning to the UT 104 so as to initialize the at least one selector list in case no such selector list(s) is/are currently stored in the UT 104. The network, such as an element of the first RAT, may also store the data and the UT 104 may access the data when needed.

In an embodiment, the selected second RAT provides coverage for the current PLMN. That is, the PLMN after the failed CSFB request is the same PLMN as before the CSFB request. The UT 104 may the check the PLMN selector list regarding the current PLMN and select the RAT from the RATs associated with the current PLMN.

In an embodiment, the second RAT which has the highest priority for the current PLMN is selected, wherein the at least one PLMN selector list comprises prioritized at least one RAT candidate for the at least one PLMN. In other words the primary access technology is resolved from the PLMN selector list(s). For example, when the current PLMN is configured in the EFPLMNwAcT—selector list so that UTRAN has higher priority than GERAN, the UT 104 may select the UTRAN RAT substantially immediately, thus saving time resources for other purposes. FIG. 5 shows PLMN #A to be associated with the 2G and the 3G networks. In this case, the RATs are prioritized so that the 3G has higher priority than the 2G. This may directly mean that the UT 104 selects the 3G as the second RAT to be applied for providing the CS services. This may be advantageous because the UT 104 may select the highest priority access technology for the selected PLMN. This may ensure that there is better probability that the UT 104 finds a suitable cell in time. This may also remove the possible need for periodic higher priority PLMN search/selection with certain preferred PLMN/RAT configuration. For example, assume that the selected PLMN is currently the highest priority PLMN, as specified according to predetermined rules, and there are multiple RATs configured in the preferred list for the selected PLMN, and UT has selected the highest priority RAT for the selected PLMN. Then the UT 104 may not have to perform a periodic higher priority PLMN scan to try to find coverage of the highest priority RAT for the selected PLMN. This may also advantageously reduce power consumption of the UT 104.

In an embodiment, the UT 104 may verify that the selected second RAT provides coverage for the current PLMN by applying coverage data comprised in the UT 104, wherein the coverage data indicates which at least one RAT in the current geographical area provides coverage for the current PLMN. Thus, even though the selector list 500 may imply for the PLMN #A that 3G is to be applied, it may be that the UT 104 is in a location where 3G does not have any coverage or does not provide coverage to the current PLMN #A. Therefore, it may be advantageous to verify which RATs do provide coverage to the PLMN #A in the current location. The UT 104 may have obtained such coverage data from the network via signaling between the UT 104 and a network to which the UT 104 was connected to when performing the CSFB service request procedure.

Alternatively or in addition to the UT 104 may have, as shown in FIG. 6, recorded the coverage data by observing which at least one RAT has provided coverage for which of the at least one PLMN along at least part of the trajectory 600 of the UT 104. As shown in FIG. 6, the mobile UT 104 may have moved along its trajectory 600 and observed which at least one PLMN is present along the trajectory. In the example case shown in FIG. 6 it may be seen that first there is only PLMN #A present (dashed line), then there are both the PLMN #A and a PLMN #B present (dotted line), and finally there is only the PLMN #A present (dashed line). The UT 104 may also observe which at least one RAT provides coverage for the observed PLMN(s). For example, when the coverage data implies that the UMTS 3G does not provide PLMN #A in the current location, the UT 104 may instead select the GSM 2G RAT even though it is not the RAT having highest priority in general for the PLMN #A but it may the RAT having the highest priority among those RATs that provide coverage for the PLMN #A in the current area of the UT 104. It should be also noted that the UT 104 may not need to know the PLMN/RAT relations along the entire moving trajectory 600, but the UT 104 may observe the PLMN/RAT relation only at the vicinity of the location where the CSFB request is triggered. The UT 104 may also apply the recorded coverage information when it enters to a location where it has already recorded the coverage information. Thus, the UT 104 may not need to record the coverage information twice in the same location. The coverage information may comprise time and location stamps so as to allow the UT 104 to know whether the coverage information for the location is already recorded or not and/or whether there is need to update the previously recorded coverage information or not.

In an embodiment, the UT 104 may select the second RAT from the at least one PLMN selector list 500 having at least one non-prioritized RAT candidate for the at least one PLMN. This is shown for a PLMN #N where the associated RATs (2G and 3G) are non-prioritized or have equal priority. In this case, the selection may be based on the coverage data comprised in the UT 104. The coverage data may be obtained as explained above with respect to FIG. 5 or from the network, for example. Thus, the UT 104 may check from the coverage data which of the non-prioritized RATs provide coverage for the PLMN #N in the current location of the UT 104. Consequently, the UT 104 may select RAT which provides coverage for the PLMN #N. In case there are multiple non-prioritized RATs and each or at least two of them provide coverage to the PLMN #N, the UT 104 may select the RAT that provides strongest reference signal received power (RSRP), for example.

In another embodiment, the UT 104 may not apply any PLMN selector list(s). Instead, the UT 104 may select the second RAT on the basis of coverage data comprised in the UT 104, wherein the stored information comprises the coverage data indicating which at least one radio access technology is associated with which at least one PLMN in which geographical areas. For example, the UT 104 may have stored information that the current PLMN has been recently detected from the GERAN. As a consequence, the GERAN may be selected as the second RAT. The coverage data may be obtained from the network and/or as illustrated with respect to FIG. 6. Therefore, it is possible that the UT 104 has stored RAT information about the selected PLMN or about a plurality of PLMNs. The information may comprise for example a list of detected PLMNs and associated access technologies. The stored coverage data may thus comprise information of many PLMNs, each PLMN being associated with RAT(s) which have been observed to provide coverage for the RAT. As said, the coverage data may be time and location stamped. The selector list(s) may also comprise prioritized or non-prioritized PLMN entries which the UT 104 may apply if the UT 104 is required to select a new PLMN, for example. This embodiment may ensure that the UT 104 may not use resources in checking for RATs that do not provide coverage to the selected PLMN. The selected PLMN may here denote the previous PLMN or a newly selected PLMN. The coverage data may be stored in the memory of the UT 104.

Figure 7:
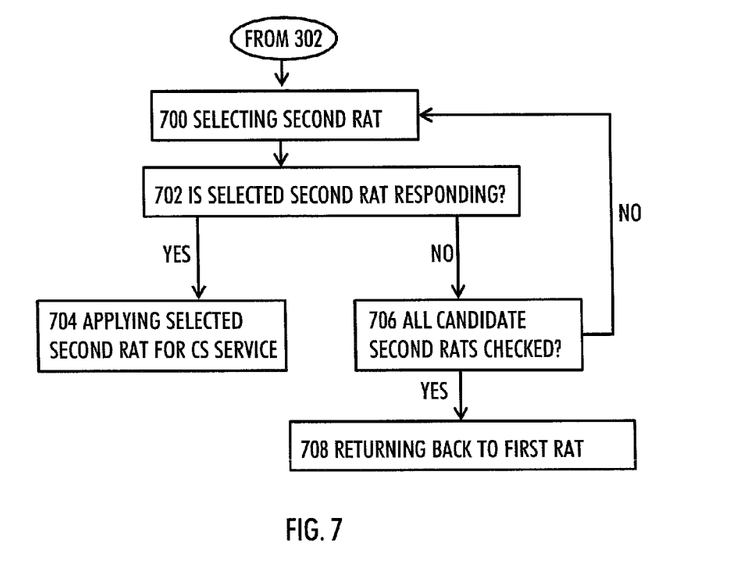
FIG. 7 depicts a method according to an embodiment.

In yet another embodiment, as shown in FIG. 7, the UT 104 may select in step 700 a second RAT among candidate seconds RATs. In step 702, the UT 104 may determine is the selected second RAT responding. If the answer is positive, the UT may in step 704 apply the selected second RAT, such as the 2G or the 3G, for CS services. However, if the answer is negative in which case the selected second RAT is not responding, the method may proceed to step 706, where it is determined whether all candidate second RATs have been tested or not. For example, it may be that there is only one candidate second RAT associated with the current PLMN, such as the 1xRTT RAT. In this case, as each candidate second RAT has been checked for response, the UT 104 may determine that no second RAT capable to operate under circuit switching is available. This may be for example due to lack of coverage of any CS network. As a consequence, the UT 104 may in step 708 return back to using the first RAT, i.e. the packet circuit network. In this case, the UT 104 may not be able to perform the CS related service at the current point in time. However, if the answer to the determination of step 706 is negative, there is still at least one candidate second RAT which has not been tried. As a result, the UT 104 may in step 700 select another second RAT. The UT 104 may continue trying other seconds RATs until one of them responds and connection may be created to the second RAT which responds. For example, when the UT 104 detects that the current PLMN is associated with both the 2G and the 3G, and priority is given to the 3G, the UT 104 may first select the 3G as the second RAT. If the 3G does not respond, i.e. the UT 104 does not connect to the 3G, the UT 104 may then try to connect to the 2G as the next selected second RAT. Only after the 2G is detected not to respond, the UT 104 may return back to using the LTE as the first RAT. This may provide for improved likelihood and reliability in acquiring the CS services.

In an embodiment, the UT 104 may select the second radio access technology on the basis of RAT availability information, wherein the stored information comprises the RAT availability information indicating which at least one radio access technology is available in which geographical areas. For example, when the UT 104 knows that it is currently operating in a PLMN of certain geographical area, such as in Japan, the UT 104 may know to select the 3G as the second RAT because the 2G is not available in Japan. This may provide for an efficient RAT selection.

Figure 8:
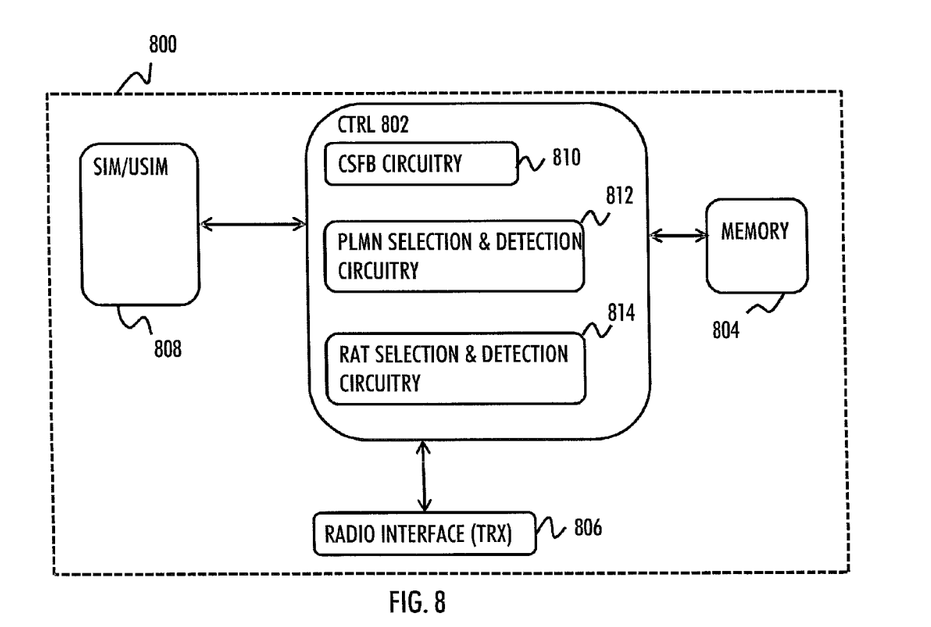
FIG. 8 illustrates an apparatus according to an embodiment.

An embodiment, as shown in FIG. 8, provides an apparatus 800 comprising at least one processor 802 and at least one memory 804 including a computer program code, wherein the at least one memory 804 and the computer program code are configured, with the at least one processor 802, to cause the apparatus 800 to carry out any one of the above-described processes. It should be noted that FIG. 8 shows only the elements and functional entities required for understanding the apparatus 800. Other components have been omitted for reasons of simplicity. The implementation of the elements and functional entities may vary from that shown in FIG. 8. The connections shown in FIG. 8 are logical connections, and the actual physical connections may be different. The connections can be direct or indirect and there can merely be a functional relationship between components. It is apparent to a person skilled in the art that the apparatus may also comprise other functions and structures.

The apparatus 800 may comprise the terminal device of a cellular communication system, e.g. a computer (PC), a laptop, a tabloid computer, a cellular phone, a communicator, a smart phone, a palm computer, or any other communication apparatus. In another embodiment, the apparatus is comprised in such a terminal device, e.g. the apparatus may comprise a circuitry, e.g. a chip, a processor, a micro controller, or a combination of such circuitries in the terminal device and cause the terminal device to carry out the above-described functionalities. Further, the apparatus 800 may be or comprise a module (to be attached to the UE) providing connectivity, such as a plug-in unit, an "USB dongle", or any other kind of unit. The unit may be installed either inside the UE or attached to the UE with a connector or even wirelessly.

The apparatus 800 may further comprise radio interface components 806 providing the apparatus with radio communication capabilities with the radio access network. The memory 804 may be connected to the processor 802. However, memory may also be integrated to the processor 802 and, thus, no memory 804 may be required. The memory 802 may be for storing data related to the RAT and/or PLMN selection, such as the coverage data, the RAT availability information, data related to roaming agreement(s), etc. The apparatus 800 may also comprise a SIM/USIM card 808. The SIM/USIM may comprise at least one PLMN selector list which the apparatus 800 may apply when selecting the second RAT, for example. Alternatively information may be stored in the network and the apparatus 800 may access the network stored information by means of the radio interface components 806 as needed.

As said, the apparatus 800 may comprise the at least one processor 802. The at least one processor 802 may be implemented with a separate digital signal processor provided with suitable software embedded on a computer readable medium, or with a separate logic circuit, such as an application specific integrated circuit (ASIC). The at least one processor 802 may comprise an interface, such as computer port, for providing communication capabilities. The at least one processor 802 may comprise a CSFB circuitry 810 for performing functionalities that relate to requesting the CSFB service procedure. The CSFB circuitry 810 may also perform the CSFB related functions.

The at least one processor 802 may also comprise a PLMN selection and detection circuitry 812 for detecting the available PLMN(s) and for selecting a PLMN to connect to. The PLMN selection and detection circuitry 812 may have limitations in the selection of the PLMN with respect to roaming agreements, user and/or operator inputs, etc.

The at least one processor 802 may also comprise a RAT selection and detection circuitry 814 for detecting the available RAT(s) for each PLMN and for selecting the RAT to connect to. The circuitry 814 may record the coverage data and store the coverage in the memory 804, for example. The circuitry 814 may be responsible for making the selection of the second RAT according to different embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configured to carry out embodiments of any of the FIGS. 1 to 8. In an embodiment, the at least one processor 802, the memory 804, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   detecting, by a user terminal connected to a current public land mobile network (PLMN) via a first radio access technology, that a circuit switched fallback service procedure requested by the user terminal has failed due to at least one of access class barring, service reject, and release of a network access stratum (NAS) connection; and
   in response to the detection, selecting a second radio access technology to be applied on the basis of coverage data contained in stored information, wherein:
   the second radio access technology to be applied is capable to provide circuit switched services; and the stored information associates at least one PLMN with at least one radio access technology and comprises: at least one PLMN selector list that is predefined by at least one PLMN; at least one radio access technology candidate for the at least one PLMN; and the coverage data indicating which at least one radio access technology is associated with which at least one PLMN in which geographical areas.

2. The method of claim 1, wherein the selected second radio access technology provides coverage for the current PLMN, the second radio access technology to be applied is UTRAN or GERAN, and the user terminal selects the second radio access technology without assistance from the current PLMN.

3. The method of claim 1, further comprising:
   selecting the second radio access technology which has the highest priority for the current PLMN, wherein the at least one PLMN selector list comprises prioritized at least one radio access technology candidate for the at least one PLMN.

4. The method of claim 3, further comprising:
   verifying that the selected second radio access technology provides coverage for the current PLMN by applying coverage data, wherein the coverage data indicates which at least one radio access technology in the current geographical area provides coverage for the current PLMN.

5. The method of claim 1, further comprising:
   selecting the second radio access technology from the at least one PLMN selector list having at least one non-prioritized radio access technology candidate for the at least one PLMN; and
   selecting the second non-prioritized radio access technology which provides coverage for the current PLMN on the basis of coverage data, wherein the coverage data indicates which at least one radio access technology in the current geographical area provides coverage for the current PLMN.

6. The method of claim 1, wherein the at least one PLMN selector list is stored in a subscriber identity module coupled to the user terminal.

7. The method of claim 1, further comprising:
   recording the coverage data by observing which at least one radio access technology has provided coverage for which of the at least one PLMN along at least part of the trajectory of the user terminal.

8. An apparatus, comprising:
   at least one processor and at least one memory including a computer program code, wherein the at least one memory and the computer program code are configured to, with the at least one processor, cause the apparatus at least to:
   detect that a network controlled radio access technology change related to a circuit switched fallback service procedure is not performed for a user terminal connected to a current public land mobile network (PLMN) via a first radio access technology and having requested the circuit switched fallback service procedure; and
   in response to the detection, select a second radio access technology to be applied on the basis of coverage data contained in stored information, wherein: the second radio access technology to be applied is capable to provide circuit switched services; and the stored information associates at least one PLMN with at least one radio access technology and comprises: at least one PLMN selector list that is predefined by at least one PLMN; at least one radio access technology candidate for the at least one PLMN; and the coverage data indicating which at least one radio access technology is associated with which at least one PLMN in which geographical areas.

9. The apparatus of claim 8, wherein the selected second radio access technology provides coverage for the current PLMN, the second radio access technology to be applied is UTRAN or GERAN, and the user terminal selects the second radio access technology without assistance from the current PLMN.

10. The apparatus of claim 8, wherein the apparatus is further caused to:
    select the second radio access technology which has the highest priority for the current PLMN, wherein the at least one PLMN selector list comprises prioritized at least one radio access technology candidate for the at least one PLMN.

11. The apparatus of claim 10, wherein the apparatus is further caused to:
    verify that the selected second radio access technology provides coverage for the current PLMN by applying coverage data, wherein the coverage data indicates which at least one radio access technology in the current geographical area provides coverage for the current PLMN.

12. The apparatus of claim 8, wherein the apparatus is further caused to:
    select the second radio access technology from the at least one PLMN selector list having at least one non-prioritized radio access technology candidate for the at least one PLMN; and
    select the second non-prioritized radio access technology which provides coverage for the current PLMN on the basis of coverage data, wherein the coverage data indicates which at least one radio access technology in the current geographical area provides coverage for the current PLMN.

13. The apparatus of claim 8, wherein the at least one PLMN selector list is stored in a subscriber identity module coupled to the user terminal.

14. The apparatus of claim 8, wherein the apparatus is further caused to:
record the coverage data by observing which at least one radio access technology has provided coverage for which of the at least one PLMN along at least part of the trajectory of the user terminal.

15. The apparatus of claim 8, wherein the apparatus is further caused to:
select the second radio access technology on the basis of radio access technology availability information, wherein the stored information comprises the radio access technology availability information indicating which at least one radio access technology is available in which geographical areas.

16. A non-transitory computer-readable memory storing computer program instructions which, when loaded into an apparatus and executed by a processor, cause the apparatus to at least:
detect, by a user terminal connected to a current public land mobile network (PLMN) via a first radio access technology, that a circuit switched fallback service procedure requested by the user terminal has failed due to at least one of access class barring, service reject, and release of a network access stratum (NAS) connection; and
in response to the detection, select a second radio access technology to be applied on the basis of coverage data contained in stored information, wherein: the second radio access technology to be applied is capable to provide circuit switched services; and the stored information associates at least one PLMN with at least one radio access technology and comprises: at least one PLMN selector list that is predefined by at least one PLMN; at least one radio access technology candidate for the at least one PLMN; and the coverage data indicating which at least one radio access technology is associated with which at least one PLMN in which geographical areas.

* * * * *